United States Patent
Werner et al.

(10) Patent No.: US 9,377,017 B2
(45) Date of Patent: Jun. 28, 2016

(54) EXTENDED ELASTICITY OF PUMP MEMBRANE WITH CONSERVED PUMP FORCE

(71) Applicant: Mindray Medical Sweden AB, Sundbyberg (SE)

(72) Inventors: Johan Werner, Skogsas (SE); Joakim Gabrielsson, Taby (SE)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 276 days.

(21) Appl. No.: 14/081,914

(22) Filed: Nov. 15, 2013

(65) Prior Publication Data
US 2014/0134024 A1    May 15, 2014

Related U.S. Application Data

(60) Provisional application No. 61/726,965, filed on Nov. 15, 2012, provisional application No. 61/726,962, filed on Nov. 15, 2012, provisional application No. 61/727,012, filed on Nov. 15, 2012.

(30) Foreign Application Priority Data

Nov. 15, 2012   (EP) .................................... 12192847
Nov. 15, 2012   (EP) .................................... 12192859
Nov. 15, 2012   (EP) .................................... 12192889

(51) Int. Cl.
F04B 45/04      (2006.01)
F04B 45/047     (2006.01)
F04B 43/00      (2006.01)
(Continued)

(52) U.S. Cl.
CPC ............ *F04B 45/047* (2013.01); *F04B 43/0063* (2013.01); *F04B 43/04* (2013.01); *H02K 41/0356* (2013.01); *Y10T 29/49236* (2015.01)

(58) Field of Classification Search
CPC ....................................................... F04B 43/02
USPC ........................................................ 92/98 R
See application file for complete search history.

(56) References Cited

U.S. PATENT DOCUMENTS

| | | |
|---|---|---|
| 3,416,461 A | 12/1968 | McFarland |
| 4,785,719 A | 11/1988 | Bachschmid et al. |
| 5,888,056 A * | 3/1999 | Kim ................. F04B 43/02 92/80 |

(Continued)

FOREIGN PATENT DOCUMENTS

| | | |
|---|---|---|
| DE | 102010009670 A1 | 2/2001 |
| DE | 102011003461 A1 | 8/2012 |
| EP | 1950416 A1 | 7/2008 |

*Primary Examiner* — Thomas E Lazo
(74) *Attorney, Agent, or Firm* — Kory D. Christensen; Stoel Rives LLP

(57) ABSTRACT

A pump comprising a pump housing member having a chamber with inner walls and an open end having a first area, the pump housing member comprises an enlarged surface surrounding the open end of the chamber. The pump further comprises a second pump housing member and a membrane element with a second area. The membrane element has a first central section having a third area with same size as the first area of the open end of the chamber. The membrane element is arranged on the pump housing element with the first central section positioned over the open end, forming a sealed chamber. A portion of the membrane element is slidably clamped between the enlarged surface and the second pump housing member.

18 Claims, 3 Drawing Sheets

(51) Int. Cl.
*F04B 43/04* (2006.01)
*H02K 41/035* (2006.01)

(56) References Cited

U.S. PATENT DOCUMENTS

| | | | | |
|---|---|---|---|---|
| 7,373,872 B2 * | 5/2008 | Kach | ............... | F04B 43/0054 92/98 R |
| 7,785,258 B2 * | 8/2010 | Braig | ............... | A61B 5/1427 600/309 |
| 8,162,635 B2 * | 4/2012 | Mizuno | ............... | F04B 11/0033 417/540 |
| 8,366,414 B2 * | 2/2013 | Kaufmann | ............... | F04B 17/04 310/15 |
| 9,057,366 B2 * | 6/2015 | Becker | ............... | F04B 43/0054 |
| 2003/0110939 A1 * | 6/2003 | Able | ............... | F04B 43/0054 92/98 R |
| 2013/0183173 A1 * | 7/2013 | Kohli | ............... | F04B 35/045 417/410.1 |

\* cited by examiner

EXTENDED ELASTICITY OF PUMP MEMBRANE WITH CONSERVED PUMP FORCE

RELATED APPLICATIONS

The present application claims the benefit under 35 U.S.C. §119(e) of U.S. Provisional Patent Application 61/726,962 filed Nov. 15, 2012 titled "PROGRESSIVE PUMP FORCE REGULATION," U.S. Provisional Patent Application 61/726,965 filed Nov. 15, 2012 titled "EXTENDED ELASTICITY OF PUMP MEMBRANE WITH CONSERVED PUMP FORCE," and U.S. Provisional Patent Application 61/727,012 filed Nov. 15, 2012 titled "Magnetic Circuit," each of which applications is hereby incorporated herein by reference in their entirety.

The present application also claims a priority benefit claims the benefit under 35 U.S.C. §119 of European Patent Application 12192847.7 filed Nov. 15, 2012 titled "PROGRESSIVE PUMP FORCE REGULATION," European Patent Application 12192859.2 filed Nov. 15, 2012 titled "EXTENDED ELASTICITY OF PUMP MEMBRANE WITH CONSERVED PUMP FORCE," and European Patent Application 12192889.9 filed Nov. 15, 2012 titled "Magnetic Circuit," each of which applications is hereby incorporated herein by reference in their entirety.

It is appreciated that the embodiments disclosed in each of the applications above may be combined in and/or utilized in combination with one another. For instance, one or more of the embodiments and/or one or more elements of embodiments described in conjunction with the "PROGRESSIVE PUMP FORCE REGULATION" application may be combined and/or used in combination with one or more embodiments or elements of embodiments described in conjunction with the "EXTENDED ELASTICITY OF PUMP MEMBRANE WITH CONSERVED PUMP FORCE" application and/or the "Magnetic Circuit" application.

BACKGROUND

1. Field of the Disclosure

This disclosure pertains in general to the field of membrane pumps or diaphragm pumps. More particularly the disclosure relates to membrane pumps used as sampling pumps in devices for patient monitoring, breath monitoring, anaesthesia monitoring, especially for medical ventilation monitoring and gas analyzers for monitoring gas composition in patient's breathing.

2. Description of Related Art

The membrane pumps have the advantages of simple, compact and good sealing. Membrane pumps have therefore been widely used in medical instrumentations and biochemical analysis as sampling pumps for fluid analysis. In the field of medical ventilation monitoring, the gas measurement module analyses gases extracted from patient breathing circuits by a membrane pump. This may be done for real time monitoring of gas composition in patient's breathing circuits and to get patient's status. Currently, the gas analysis module tends to be smaller with increased reliability and low power exhaust. Hence there are higher requirements for the design of membrane pumps concerning size, life and energy loss.

Gas monitoring instruments, such as sensors, used to detect gases are precision components sensitive to vibration interference which reduces the measurement accuracy. Under normal circumstances, the sampling pump is a main vibration source in a monitoring module. Thus may introduce noise which could affect the measurement accuracy. The sampling pump is therefore required to provide a more stable sample flow.

The normal design of a membrane pump has a flat membrane and a pump chamber which is either spherically concave or cylindrical with a flat bottom. Two examples of there types of pumps are Thomas membrane pump or Xavitech membrane pump. Also, membrane pumps have normally membranes that are fixed to outer edges of the membrane, thus defining a pump area. This design is limiting the elastic behaviours of the membrane, is limiting the stroke length and the pump area is limiting the maximum pump pressure (since the area together with the pump force is defining the maximum pump pressure) and the fatigue life. Other problems are when a flat membrane meets a concave or a flat surface of the pump chamber. This will generate noise and the pump stroke will stop instantly causing mechanical vibrations.

Hence, a new improved design of a membrane pump would be advantageous. Especially a smaller pump with a higher pressure having low vibrations and that runs quieter than known membrane pumps.

SUMMARY

Accordingly, embodiments of the present disclosure preferably seek to mitigate, alleviate or eliminate one or more deficiencies, disadvantages or issues in the art, such as the above-identified, singly or in any combination by providing a device or method according to the appended patent claims for providing extended elasticity of pump membrane with conserved pump force, such as in devices for patient monitoring, breath monitoring, anaesthesia monitoring, especially for medical ventilation monitoring and gas analyzers for monitoring gas composition in patient's breathing.

Disclosed herein are device, system and methods for providing the extended elasticity of the pump membrane with conserved force.

According to one aspect of the disclosure a pump comprising a pump housing member, a membrane element and a second pump housing member is disclosed. The pump housing member is having a chamber with walls and an open end having a first area. The pump housing member comprises an enlarged surface surrounding the open end of the chamber. The membrane element has a second area. The membrane element has a first central section having a third area with same size as the first area of the open end of the chamber. The membrane element is arranged on the pump housing with the first central section positioned over the open end, forming a sealed chamber. A portion of the membrane element is slidably clamped between the enlarged surface and the second pump house member in such a way that the clamped portion is allowed to move radially and to stretch when a force is applied.

The advantages with this configuration are that by holding a membrane element slidably fixed at a larger diameter than the actual working diameter (area) is that the membrane is free to move radial and stretch. The larger area makes it possible for the membrane to stretch more, hence a longer pump stroke may be achieved (i.e. more volume can be pumped per stroke). Also, due to the radial movement the same pump volume can be maintained with less stretching which will increase the membranes fatigue life dramatically, i.e. a longer life of the membrane due to lower fatigue stress levels. The membrane's elastic resistance will consume less of the available force so a more effective use of the available pump force may be provided.

The first central section and the chamber may both have circular shapes.

In some examples may the walls be bevelled inner walls. The bevelled inner walls may be straight, or concave, or convex, or have two or more radii, or have a sinoidal shape, or be of shaped as a polynomial of higher order.

The third area of the first central section of the membrane element may be an effective pump area.

The enlarged surface of the pump housing member may have an area with at least the same size as the membrane element.

In some examples has the membrane element a protruding brim. This works as n O-ring to increase the sealing effect.

The enlarged surface may comprises a groove to fit the protruding brim of the membrane member. This may be used to fix the membrane element to the pump housing member.

In some examples has the membrane element a second central section with a fourth area. The second central section may be a central portion of the membrane element. The second central section is thicker than the rest of the membrane element. The rest of the membrane may be considered a periphery section surrounding the second central section. Also the fourth area of the second central section is smaller than the first area of the open end of the chamber.

The advantages with this disclosed configuration is that it prevents the stroke from hitting the bottom of the chamber since a pump stroke is decelerated in a progressive way which not only makes the stop silent but also reduces the mechanical vibrations and keep them to a minimum. Further, the deceleration reduces the effective pump area of the membrane closer to the end of a stroke. Since the force of the stroke is constant, the pump becomes stronger closer to the end of the stroke.

The second central section may have a circular shape.

In some examples, the membrane may be made of an elastic material. The material may be rubber and/or is selected from a list including: Chloroprene, EPDM, FKM/FPM, Silicon, TPE or nitrile.

In some examples may the thickness ratio between the second central section to the rest of the membrane element be between 2 to 15.

In some further examples may a ratio between the second area of the membrane element to the third area of the first central section between 1.5 to 10.

In some examples has the second central section bevelled outer walls with a base larger than a top section, such as a truncated cone.

In some examples may the second pump housing member have an edge which is conical or has one or more radii positioned towards the open end.

According to another aspect of the disclosure a method for extended elasticity of pump membrane is disclosed. The method comprising the step of providing a pump as herein described. Applying a reciprocating stroke motion to the first centre section of the membrane element whereby a portion of the membrane element is slidably clamped between the enlarged surface of the pump housing member and the second pump housing member so that the clamped portion is free to move radially and to stretch.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the disclosure are capable of will be apparent and elucidated from the following description of embodiments of the present disclosure, reference being made to the accompanying drawings, in which.

DESCRIPTION OF THE EMBODIMENTS

Figure 1:
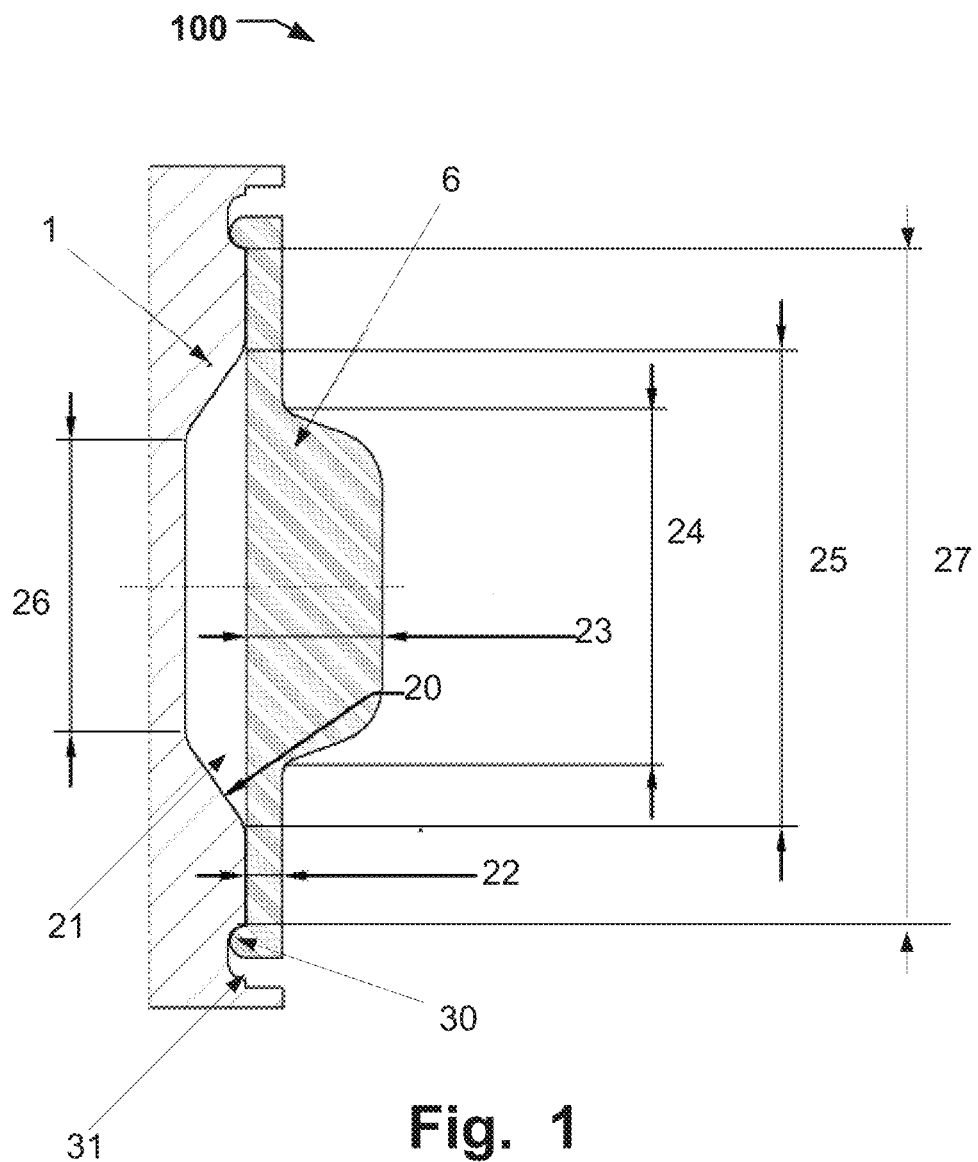
FIG. 1 is illustrating a cross-sectional schematic overview of an example of a pump house and a membrane.

Specific embodiments of the disclosure now will be described with reference to the accompanying drawings. This disclosure may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the disclosure. In the drawings, like numbers refer to like elements.

The following description focuses on an embodiment of the present disclosure applicable to a membrane element and to a membrane pump. The membrane pump is to be used as a sampling pump in devices for patient monitoring, breath monitoring, anaesthesia monitoring, especially medical ventilation monitoring and gas analyzers for monitoring gas composition in patient's breathing. However, it will be appreciated that the invention is not limited to this application but may be applied to many other systems where a fluid pump is required.

FIG. 1 illustrates a membrane pump 100, with an example of a pump housing element 1 and a membrane element 6. The pump housing element has a chamber 21 with an open end having a first area. The membrane element 6 is arrangeable over the open end of the chamber 21 to seal the chamber 21.

The chamber 21 has bevelled or chamfered walls 20. The bevelled or chamfered walls 20 may be straight, such as in the shape of a truncated cone, illustrated in FIG. 1. In some examples, the bevelled or chamfered walls 20 may be convex or concave. In other examples, the walls 20 have more than one radii. In other configurations the walls 20 may have a sinoidal shape, a wave shape, a polynomial shape or spline shaped. The chamber 21 is preferably circular but may have any shape such as, a square, rectangular, a polygon or an ellipsoid.

Additionally and/or alternatively, in some examples, the bottom area of the chamber 21 has an area 26 which is smaller than the area 25 of the open end.

Figure 2:
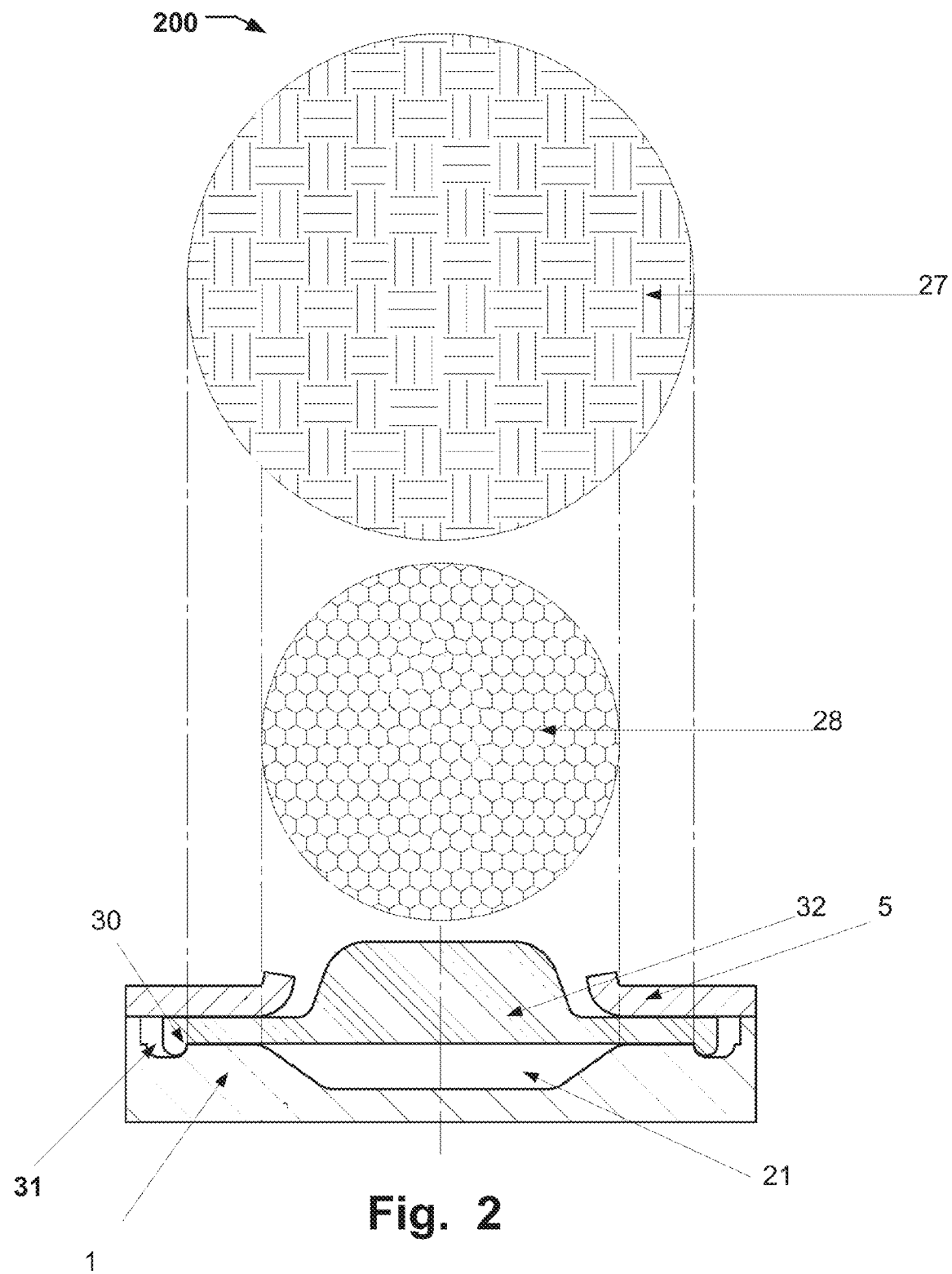
FIG. 2 is illustrating a cross-sectional schematic overview of an example of a pump house and a membrane.

The membrane element 6 has a second area 27 and a first central section having a third area 28 (see FIG. 2). The first central section is a central portion of the membrane element. Thus the third area is smaller than the second area 27.

The membrane element has preferably a circular shape but may have any shape, such as a square, rectangular, a polygon or an ellipsoid. Additionally, the first central section has preferably a circular shape but may have any shape, such as a square, rectangular, a polygon or an ellipsoid.

The shape of the membrane element and first central section does not need to be the same, for example, the membrane element may be a square while the first central section has is circularly shaped. Preferably, the first central section has the same shape as the open end of the chamber.

The membrane element is preferably made of a flexible or elastic material, such as rubber. Examples of materials that may be used are Chloroprene, EPDM, FKM/FPM, Silicon, TPE or nitrile. But other materials with similar properties known by the skilled person may be used.

Additionally and/or alternatively, the membrane element may include a second central section having a fourth area 24. The second central section has a thickness 23 which is larger than the thickness 22 of the rest of the membrane element. The rest of the membrane may be defined as a periphery section surrounding the second central section Preferably the ratio between the thicknesses 23 of the second central section to the thickness 22 of the rest of the membrane element may be between 2 to 15.

The thicker second central section may preferably be shaped to protruding in an opposite direction from the open end of the chamber. The walls of the protruding part are bevelled or chamfered, such as a truncated cone or convex or concave. Alternatively, in some examples, the protruding part may be shaped as a segment of a circle or a half circle.

Additionally, in some examples, the thicker second central section of the membrane element may preferably have a smaller area than the opening. Also the thicker second central section of the membrane element may be centrally positioned over the open end of the chamber 21.

The thickness of the second central section provides for a stiffer central part of the membrane element 6 at a location where a reciprocating pump stroke motion from an actuator, such as a voice coil, a minimotor, a piston, a cam or any other mechanical device that could be used to expose the membrane element 6 to a force, is applied. When the stoke motion presses the membrane element towards the chamber 21 the downward motion of the thicker second central section will be restricted by the bevelled inner walls 20 of the chamber 21 at a position where the second central section of the membrane element 6 becomes thicker. This will decelerate the pump stroke in a progressive way. This will not only provide a silent the stop of the stroke but also reduce mechanical vibrations to a minimum.

Another advantage is that when the pump stroke reaches deeper into the chamber the actual pumping area, e.g. the effective pump area, becomes smaller but the force of the stroke is the same. Hence the pump 100 becomes stronger, i.e. is able to generate a higher pressure. This is in accordance with the equation:

$$P=F/A \quad (1)$$

where, P is the pump pressure, F is the force of the stroke and A is the effective pump area.

Further, this configuration prevents the stroke to hit the bottom of the chamber.

Depending on the desired pump characteristics the shape and the thickness 23 of the thicker section can be varied. The same applies to the design of the inner walls 20 of chamber.

Additionally, in some examples, the membrane element 6 may have a protruding brim 30. This brim 30 may be positioned at the periphery edge of the membrane element 6. Further, the pump housing 1 may have an enlarged surface surrounding the open end of the chamber 21. This enlarged surface may comprise a groove 31 to fit the protruding brim 30 of the membrane member 6. This may increase the sealing effect in the same fashion as an O-ring.

Additionally, in some examples, the enlarged surface may have an area at least the same as the area of the membrane element 6.

FIG. 2 illustrates further example of a membrane pump 200. The membrane pump 200 has a pump housing member 1 and a membrane element 32. In the illustration the pump housing member 1 and membrane element 32 may be configured in accordance with the description to FIG. 1.

Alternatively, in some examples, the pump housing 1 and could have a chamber 21 which either has a spherical or a flat bottom surface.

The total area 27 of the membrane element 32 is an elastic membrane area 27 and the part of the membrane element 32 covering the open end of the chamber 21 is the effective pump area 28 (i.e. same as the area 25 of the open end). Additionally, in some examples, when the membrane element 32 has a centrally positioned second central section having a thickness 23 larger than a thickness 22 rest of the membrane element (see FIG. 1), the effective pump area (i.e. the first central section) 28 is larger than the area 24 of the second central section.

A major difference between the design illustrated in FIG. 2 and prior art is that the membrane element 32 is not fixed at the edge of the chamber 21. Instead a portion of the membrane element 32 is slidably clamped between an enlarged surface of the pump housing 1 and a second member 5 of the pump housing 1. The second member 5 of the pump housing 1 may be a membrane fixing plate. In the area between the second member 5 of the pump housing 1 and the enlarged surface of the pump housing 1, the membrane element 32 is free to move radial and to stretch when a force is applied.

Additionally, in some examples, the membrane element 32 may be fixed at an outer diameter, for example, by a protruding brim 30 fitted into a groove 31 at the enlarged surface of the pump housing 1. In the area between the fixing point and the pump chamber 21 the membrane element 32 is in this configuration still able to freely move radially and stretch.

By letting a portion of the membrane element 32 slide between two flat surfaces of the enlarged surface of the pump housing 1 and the second member 5 an elastic area 27 which is larger than the actual effective pump area 28 is used. This allows the membrane element 32 to stretch more, i.e. enabling a longer stroke, hence more volume per stroke.

The slidebly clamped portion of the membrane element 32 is located between the membrane fixing point (i.e. an outer edge) and the chamber 21. When keeping the length of the stroke, the same pump volume can be maintained with less stretching which may increase the membrane fatigue life due to less fatigue stress levels. Also, the elastic resistance of the membrane element 32 may consume less of the available pumping force when comparing a pump of a design illustrated in FIG. 2 with a prior art pump, both having same pump chamber size. The same effect would also be achieved if a flat membrane element would have been used instead of a membrane element with a thicker midsection as illustrated in the figures.

The material of the pump housing 1 and the second pump housing member 5 should have low friction and be stiff. Some examples of materials are polymer, metal or composite materials.

A problem with having a flat membrane surface meeting a concave spherical surface or a flat surface is that the meeting between these two will generate noise and the pump stroke movement will stop instantly causing mechanical vibrations. By designing the shape of the pump chamber 21 to have wall being conical or with one or more radii positioned in the area where the membrane element 32 becomes stiffer (thicker) it is possible to decelerate the pump stroke in a progressive way. This will make the stops, when the membrane element is in its end positions silent and also reduces the mechanical vibrations due to the progressive motion deceleration.

Additionally and/or alternatively, by designing the edge of the second pump housing member 5 (i.e. membrane fixing plate) to be conical or with one or more radii positioned in the area where the membrane element 32 becomes stiffer (thicker) it may also be possible to decelerate the pump stroke in a progressive way. This will make the stops, when the membrane element is in its turning point silent and also reduces the mechanical vibrations due to the progressive motion deceleration.

Depending on the desired pump characteristic and the obtainable amount of force, the shape of the cavity and membrane fixing plate wall may be designed in many different ways, a straight chamfer, a convex or concave radii etc.

Additionally, in some examples of a pump 200 according to the illustration of FIG. 2 a preferred ratio between the area 27 of the elastic membrane element to the effective pump area 28, defined by the previous equation 1, is between 1.5 to 10. The longer a stroke is the larger the difference between the two areas has to be.

Figure 3:
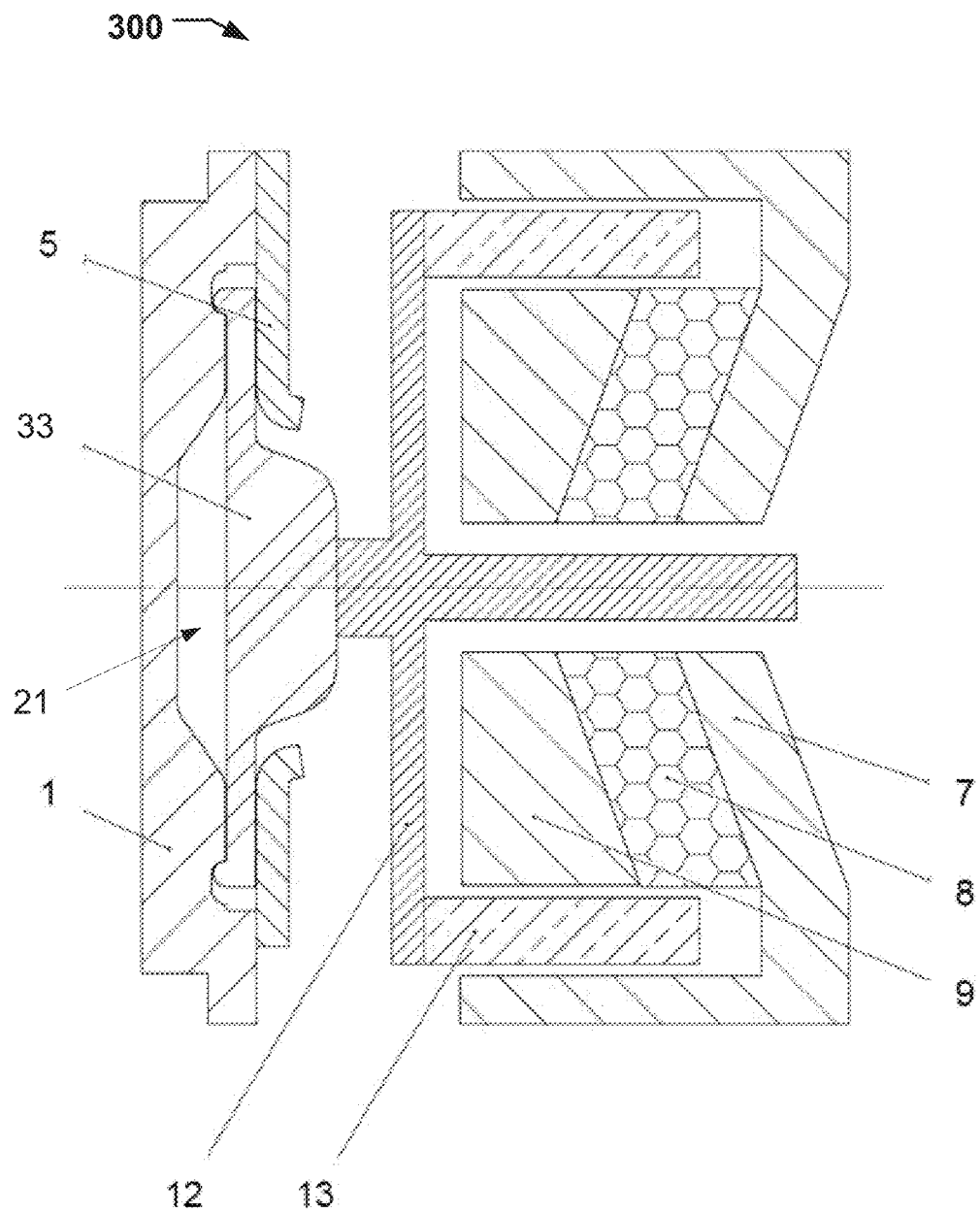
FIG. 3 is illustrating a cross-sectional schematic overview of a membrane pump.

FIG. 3 illustrates a cross-sectional view of an example of a membrane pump 300. The membrane pump 300 comprises a membrane element 33 (according to any of the herein disclosed configurations) and a pump housing 1, and optional second housing member 5 (e.g. membrane fixing plate) and a pump chamber 21. In this example, the pump chamber 21 has bevelled walls to abutting the area where the membrane element 33 becomes thicker. Hence decelerate the pump stroke in a progressive way.

The pump further comprises a pump head 12. In this example, the pump head 12 is abutting the second central section of the membrane element 33. Alternatively, in some examples, the pump head may be mechanically attached to the top of second central section, such as inserted into the second central section or a screw could be used to screw secure them together. When using a pump head 12 abutting the top of the second central section an adhesive may be used between the top of the second central section and the abutting area of the pump head 12 to affix the two members. Examples of adhesives may be, glue, sticky tape, etc.

In this example depicted in FIG. 3, the actuator exerting a force on the membrane element 33 is a voice coil. The voice coil is used to transmit a reciprocating stroke motions by the pump head 12 to the membrane element 33. Specifically, the voice coil may be a cylindrical voice coil.

In one example, the coil 13 is a circular cylinder structure, which is fixed on the pump head 12 and placed in an air gap. The air gap is enclosed by a magnetic cup with conical bottom 7, a conical magnet 8, such as a permanent magnet, and a one side conical pole shoe 9.

Additionally, in order to maximize the utilization of the magnetic field in the air gap and reduce the size of the pump 300, the coil 13 may be a skeletonless coil, entwined by self-adhesive lining. This design may take advantage of the limit space of the air gap, hence it's possible to design smaller membrane pumps 300.

In the example illustrated in FIG. 3, the magnet cup with a conical bottom 7 is positioned as an inverted M-shape. The contact surface between the conical pole shoe 9, the conical magnet 8 and the contact surface between the conical magnet and conical bottom of the magnet cup 7 are all tapered. The tapered surfaces are tapered in the same direction. Such structure increases the side area of the conical pole shoe 9, making the magnetic field in the air gap distribute evenly radially.

This design allows for a larger magnet, better distribution of the magnetic flux inside the pole shoe 9. Further, the conical shape provides better support for the free shaft of the pump head 12 without adding any volume outside of the cylinder volume. Thus the magnetic field is as large as possible when the coil 13 works in the air gap.

In FIG. 3, the working principle of the membrane pump 300 is: the coil 13 positioned in the magnetic field formed by the one side conical pole shoe 9, the conical magnet 8 and the magnet cup with conical bottom 7. When an alternating voltage is transmitted to the coil 13, the coil 13 will produce an alternating ampere force to drive the pump head 12 in reciprocating linear motion.

The pump cycle will produce a cycle of positive and negative pressure in the pump chamber 21. When pressure in the sealed room is negative, fluid will move through a pump inlet into the chamber 21. When pressure in the sealed room is positive, the pump 300 will move fluid out through an outlet.

In the example illustrated in FIG. 3, a small voice coil is adopted to drive membrane to do linear motion so that large transmission mechanisms are eliminated. Thus the size of the membrane pump 300 is reduced. The voice coil does not affect the working life of the pump 300, because the voice coil does not comprise structures that are easily worn out. The voice coil drives the membrane element 33 directly without the process of transforming motion to another; hence no intermediate energy is consumed. Further, there is no starting torque problem; hence the pump 300 may start almost instantly by applying a small voltage. The voice coil therefore also output a force or a displacement of the pump head 12 to collect a small volume of fluid even at small driving voltage or current.

Also, the reciprocating motion of the pump head 12 is controlled by controlling the frequency of the voltage. Because the magnitude of reciprocating motion is dependent to the amplitude of the current, the collected flow size may be easily controlled by adjusting the amplitude of the voltage to the voice coil.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

The invention claimed is:

1. A pump comprising:
   a first pump housing member including a chamber with an inner wall and an open end having a first area, wherein said first pump housing comprises an enlarged surface surrounding said open end of said chamber;
   a second pump housing member; and
   a membrane element with a second area, wherein said membrane element has a first central section having a third area with same size as said first area of said open end of said chamber,
   wherein said membrane element is arranged on said first pump housing member with said first central section positioned over said open end, forming a sealed chamber, and
   wherein a portion of said membrane element is slidably clamped between said enlarged surface and said second pump housing member, such that the clamped portion is allowed to move radially and to stretch when a force is applied.

2. The pump according to claim 1, wherein said first central section and said chamber both have circular shapes.

3. The pump according to claim 1, wherein said inner wall is bevelled and wherein the bevelled inner wall is one of: straight, concave, convex, has two or more radii, has a sinoidal shape, or shaped as a higher order polynomial.

4. The pump according to claim 1, wherein said third area of said first central section of said membrane element is an effective pump area.

5. The pump according to claim 1, wherein said enlarged surface of said first pump housing member has an area with at least the same size as said membrane element.

6. The pump of claim 1, wherein said membrane element has a protruding brim.

7. The pump according to claim 1, wherein said enlarged surface comprises a groove to fit said protruding brim of said membrane member.

8. The pump according to claim 1, wherein said membrane element comprising a second central section with a fourth area;
wherein said second central section is thicker than the rest of said membrane element, and said fourth area of said second central section is smaller than said first area of said open end of said chamber.

9. The pump of claim 8, wherein said second central section has a circular shape.

10. The pump according to claim 8, wherein a thickness ratio between said second central section to the rest of said membrane element is between 2 and 15.

11. The pump according to claim 1, wherein said membrane is made of an elastic material.

12. The pump according to claim 11, wherein said material comprises at least one of rubber, Chloroprene, EPDM, FKM/FPM, Silicon, TPE or nitrile.

13. The pump according to claim 1, wherein a ratio between said second area of said membrane element and said third area of said first central section is between 1.5 and 10.

14. The pump according to claim 1, wherein said second central section includes a bevelled outer wall with a base larger than a top section, such as a truncated cone.

15. The pump according to claim 1, wherein said second pump housing member has an edge which is conical or has one or more radii positioned toward said open end.

16. The pump according to claim 1, wherein a portion of said membrane element is slidably clamped between said enlarged surface of said first pump housing member and said second pump housing member, such that said clamped portion is free to move radially and to stretch during a reciprocating stroke motion of said first center section of said membrane element.

17. The pump according to claim 1, wherein the pump is configured for use in conjunction with one of a patient monitoring system, a breathing monitoring system, and an anaesthesia monitoring system.

18. A method comprising:
providing a first pump housing member having a chamber with an inner wall and an open end having a first area, wherein said pump housing comprises an enlarged surface surrounding said open end of said chamber;
providing a second pump housing member;
providing a membrane element with a second area,
wherein said membrane element includes a first central section having a third area with same size as said first area of said open end of said chamber,
arranging said membrane element on said pump housing member with said first central section positioned over said open end, forming a sealed chamber, and
slidably clamping a portion of said membrane element between said enlarged surface and said second pump housing member, such that the clamped portion is allowed to move radially and to stretch when a force is applied.

* * * * *